United States Patent [19]

Suzuki et al.

[11] Patent Number: 5,282,137
[45] Date of Patent: Jan. 25, 1994

[54] DRIVING WHEEL SLIP CONTROL SYSTEM

[75] Inventors: Norio Suzuki; Yoshio Wazaki; Tetsuya Oono, all of Saitama, Japan

[73] Assignee: Honda Giken Kogyo Kabushiki Kaisha, Tokyo, Japan

[21] Appl. No.: 665,862

[22] Filed: Mar. 7, 1991

[30] Foreign Application Priority Data

Jun. 13, 1990 [JP] Japan ................................. 2-154264

[51] Int. Cl.$^5$ .............................................. B60K 28/16
[52] U.S. Cl. .............................. 364/426.03; 180/197; 123/333; 123/335; 364/431.05
[58] Field of Search ....................... 364/426.01, 426.02, 364/426.03, 431.05; 180/197; 123/333, 332, 481, 334, 335

[56] References Cited

U.S. PATENT DOCUMENTS

| | | | |
|---|---|---|---|
| 4,432,430 | 2/1984 | Lind | 180/197 |
| 4,620,420 | 11/1986 | Gloss | 60/602 |
| 4,721,176 | 1/1988 | Kabasin et al. | 180/197 |
| 4,850,446 | 7/1989 | Leiber et al. | 180/197 |
| 4,856,610 | 8/1989 | Leiber et al. | 180/197 |
| 4,921,064 | 5/1990 | Wazaki et al. | 180/197 |
| 4,933,857 | 6/1990 | Hashiguchi et al. | 364/426.02 |
| 4,971,164 | 11/1990 | Fujita et al. | 180/197 |
| 5,033,573 | 7/1991 | Hrovat | 180/197 |
| 5,046,461 | 9/1991 | Kanehiro et al. | 180/197 X |
| 5,067,579 | 11/1991 | Kushi et al. | 180/197 |
| 5,085,288 | 2/1992 | Shiraishi et al. | 180/197 |
| 5,155,686 | 10/1992 | Shiraishi et al. | 364/426.03 |
| 5,168,952 | 12/1992 | Oono et al. | 180/197 |

FOREIGN PATENT DOCUMENTS

| | | |
|---|---|---|
| 3224254 | 1/1983 | Fed. Rep. of Germany . |
| 3344819 | 6/1985 | Fed. Rep. of Germany . |
| 3937200 | 5/1990 | Fed. Rep. of Germany . |

Primary Examiner—Thomas G. Black
Assistant Examiner—Collin W. Park
Attorney, Agent, or Firm—Armstrong, Westerman, Hattori, McLeland & Naughton

[57] ABSTRACT

When the output from an internal combustion engine is reduced using a combination of a throttle valve control device, a fuel cut control device and an ignition retard control device, the starting point of operation of the ignition retard control device in a control region of condition for an excessive slipping of the driving wheel is provided between the starting region of operation of the throttle valve control device and the starting region of operation of the fuel cut control device. This permits the fuel cut control device to have a high responsiveness to a sudden variation in excessive slipping and no exhaust heat to be discharged, and also permits the throttle valve control device to become lower in responsiveness after the excessive slipping has been substantially converged but to have a small variation in fuel-air ratio. The ignition retard control device starts operation only when the excessive slipping cannot be suppressed by the throttle valve control device. Therefore, the use of the ignition retard control device which relatively easily permits an increase in the temperature of an exhaust gas can be restrained to the minimum.

12 Claims, 10 Drawing Sheets

DRIVING WHEEL SLIP CONTROL SYSTEM

BACKGROUND OF THE INVENTION

1. Field of the Invention

The field of the present invention is driving-wheel slip control systems of the type having a throttle valve control means, a fuel cut control means and an ignition retard control means each for controlling the output of an internal combustion engine, wherein when an excessive slipping of a driving wheel driven by the internal combustion engine has been detected, the output from the internal combustion engine is reduced by use of at least one of the throttle valve control means, the fuel cut control means and the ignition retard control means.

2. Description of the Related Art

There is a conventionally known system for reducing the output from the internal combustion engine to prevent an excessive slipping of the driving wheel, which uses a combination of a fuel supply amount control means and an ignition retard control means (see Japanese Patent Application Laid-open No. 263243/88).

A catalyst mounted in an exhaust pipe for the purpose of cleaning an exhaust gas from an internal combustion engine is heated by a redox reaction with the exhaust gas. In the prior art driving-wheel slip control system, the increase in temperature of the catalyst is considerable when the supplying and cutting operations of fuel are repeated. In addition, when an ignition retard control is conducted, the exhaust gas itself is heated to a high temperature and hence, the heating of the catalyst is promoted. Especially, when a vehicle is in an accelerated slipping state, the flow rate of the exhaust gas increases and for this reason, the catalyst is further heated to a higher temperature, resulting in a precipitated deterioration of the performance of the catalyst.

SUMMARY OF THE INVENTION

Accordingly, it is an object of the present invention to provide a driving-wheel slip control system, which prevents the temperature of a catalyst for cleaning an exhaust gas from increasing.

To achieve the above object, according to the present invention, there is provided a driving-wheel slip control system comprising a throttle valve control means, a fuel cut control means and an ignition retard control means for controlling an output of an internal combustion engine, wherein when excessive slipping of a driving wheel driven by the internal combustion engine is detected, the output from the internal combustion engine is reduced by use of at least one of the throttle valve control means, the fuel cut control means and the ignition retard control means, and wherein within a region for control of the excessive slipping of the driving wheel a starting region of operation of the ignition retard control means is provided between a starting region of operation of the throttle valve control means and a starting region of operation of the fuel cut control means.

With the above construction, the output from the internal combustion engine is controlled by the fuel-cut control means which has a high responsiveness to a sudden variation in excessive slipping of the driving wheel and permits no heated gas to be discharged, and after the excessive slipping is substantially converged by the fuel-cutting, the output from the internal combustion engine is controlled by the throttle valve control means which is lower in responsiveness than the fuel cut control means but provides a smaller variation in the fuel-air ratio of a fuel-air mixture. The ignition retard control means is operated only when the excessive slipping has increased in a control region for use of the throttle valve control means and the engine output control requires a high responsiveness. This ensures that the use of the ignition retard control means, which relatively easily permits an increase in the exhaust gas temperature can be kept to a minimum, and therefore, the catalyst for cleaning the exhaust gas can be prevented from being deteriorated while insuring a high control responsiveness.

In addition, if the throttle valve control means is simultaneously operated during operation of the ignition retard control means, the control of a throttle valve is also conducted simultaneously when an ignition retard control is being conducted. This provides a reduced flow rate of the exhaust gas to prevent the deterioration of the catalyst.

Further, if a control quantity calculating means is provided for calculating, in response to detection of an excessive slipping in the driving wheel, control quantities of the ignition retard control means and the throttle valve control means on the basis of a deviation between a target value and an actual value of the excessive slipping, then a feed-back control of the output from the internal combustion engine by the throttle valve and an ignition retarding is effected when the driving wheel is in a small slipping state. This ensures that when the vehicle is travelling on a substantially uniform road surface, the processing cannot frequently enter the fuel-cutting operation, so that the variation in fuel-air ratio is controlled to inhibit the deterioration of the catalyst.

The above and other objects, features and advantages of the invention will become apparent from a reading of the following description of the preferred embodiment, taken in conjunction with the accompanying drawings.

BRIEF DESCRIPTION OF THE DRAWINGS

FIGS. 5 to 8A and 8B are flow charts for explaining the processes of a control program executed in the driving-wheel torque reducing means, wherein

DESCRIPTION OF THE PREFERRED EMBODIMENT

The present invention will now be described by way of one embodiment in connection with the accompanying drawings.

Figure 1:
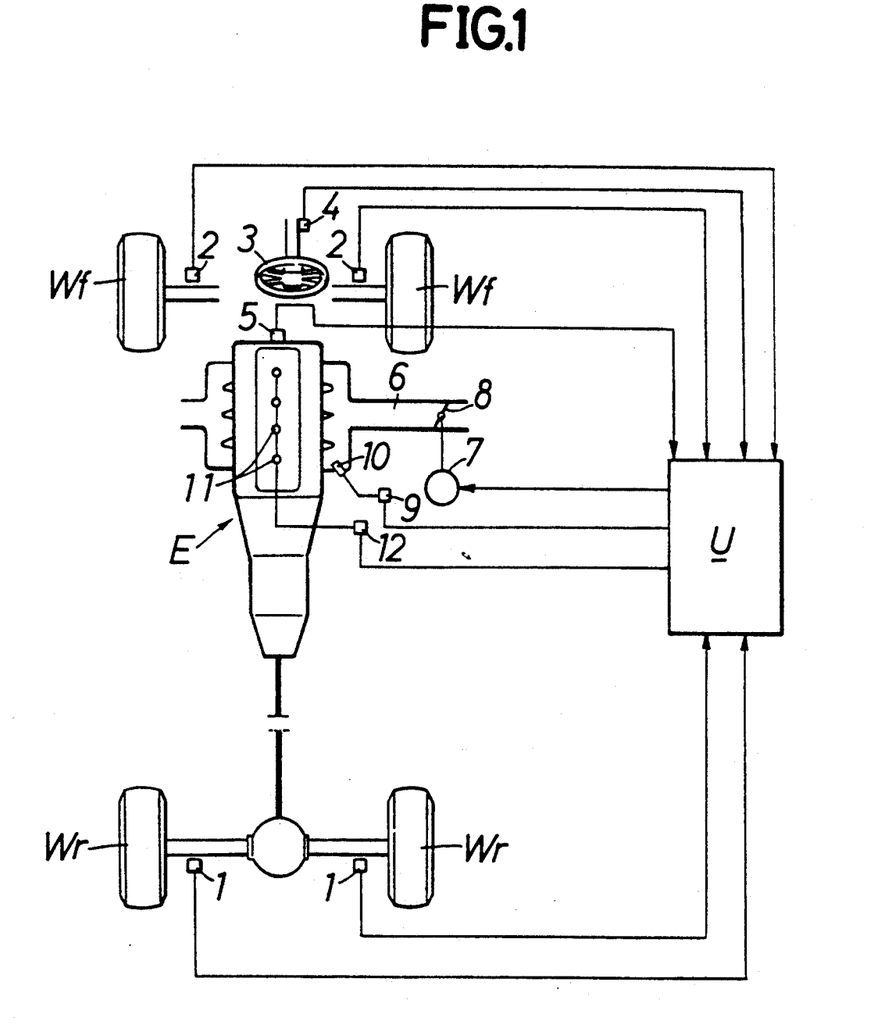
FIG. 1 is a schematic illustration of a construction of a vehicle equipped with a system according to one embodiment of the present invention.

FIG. 1 schematically illustrates the construction of a rear wheel drive vehicle equipped with a control system according to an embodiment of the present invention. The vehicle includes a pair of driving wheels Wr driven by an internal combustion engine E, and a pair of driven or follower wheels Wf. The driving and driven wheels Wr and Wf are provided with a driving-wheel speed detector 1 and a driven-wheel speed detector 2 for detecting speeds Vw and Vv thereof, respectively. A steering-angle detector 4 is provided on a steering wheel 3 for detecting a steering angle δ, and a rotational speed detector 5 is provided on the internal combustion engine E for detecting the rotational speed Ne of a crankshaft of the engine and comprises a gear and an electromagnetic pick-up. A throttle valve 8 is mounted in an intake passage 6 in the internal combustion engine E. A throttle valve control means 7 comprising a pulse motor, is connected to the throttle valve 8 so as to drive the valve 8 for opening and closing. Further, a fuel injection valve 10 is mounted at a downstream end of the intake passage 6 and includes a fuel cut control means 9. An ignition retard control means 12 is connected to spark plugs 11 of the internal combustion engine E. The driving-wheel speed detector 1, the driven-wheel speed detector 2, the steering angle detector 4, the rotational speed detector 5, the throttle valve control means 7, the fuel cut control means 9 and the ignition retard control means 12 are connected to an electronic control unit U comprising a microcomputer.

Figure 2:
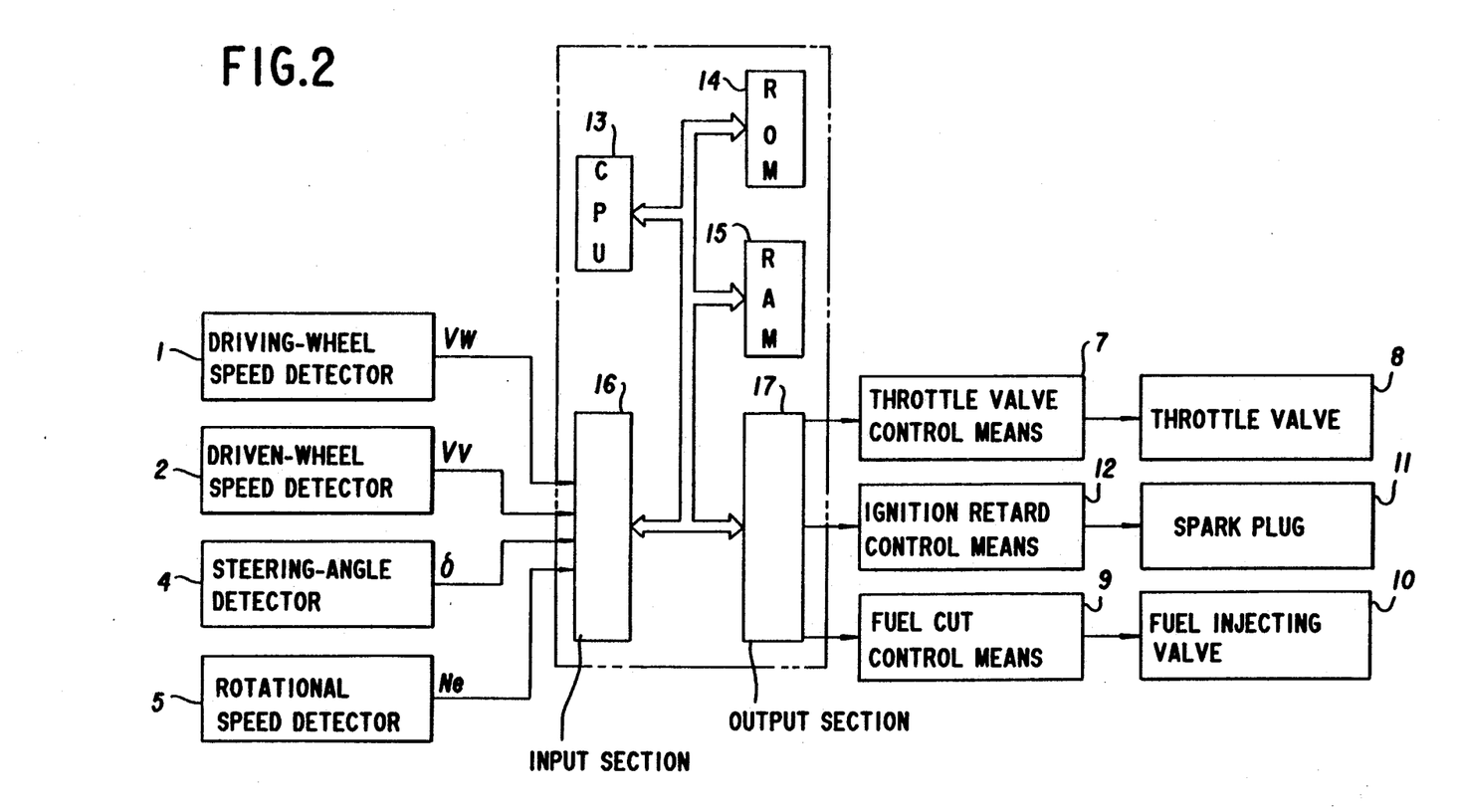
FIG. 2 is a block diagram illustrating an electronic control unit.

FIG. 2 illustrates the electronic control unit U which processes detection signals received from the individual detectors according to a control program and operates the throttle valve control means 7, the fuel cut control means 9 and the ignition retard control means 12. The electronic control unit U is comprised of a central processing unit (CPU) 13 for executing the above process, a read-only memory (ROM) 14 stores the control program and data such as various maps therein, a random access memory (RAM) 15 which temporarily stores the detection signals from the detectors and processing results, an input section 16 to which are connected the detectors, i.e., the driving-wheel speed detector 1, the driven-wheel speed detector 2, the steering angle detector 4 and the rotational speed detector 5, and an output section 17 to which are connected the throttle valve control means 7, the fuel cut control means 9 and the ignition retard control means 12. Thus, the electronic control unit U processes, in the CPU, detection signals received by the input section 16 and the data stored in the read-only memory 14 according to the control program which will be described hereinafter, and finally operates the throttle valve control means 7, the fuel cut control means 9 and the ignition retard control means 12 through the output section 17.

Figure 3:
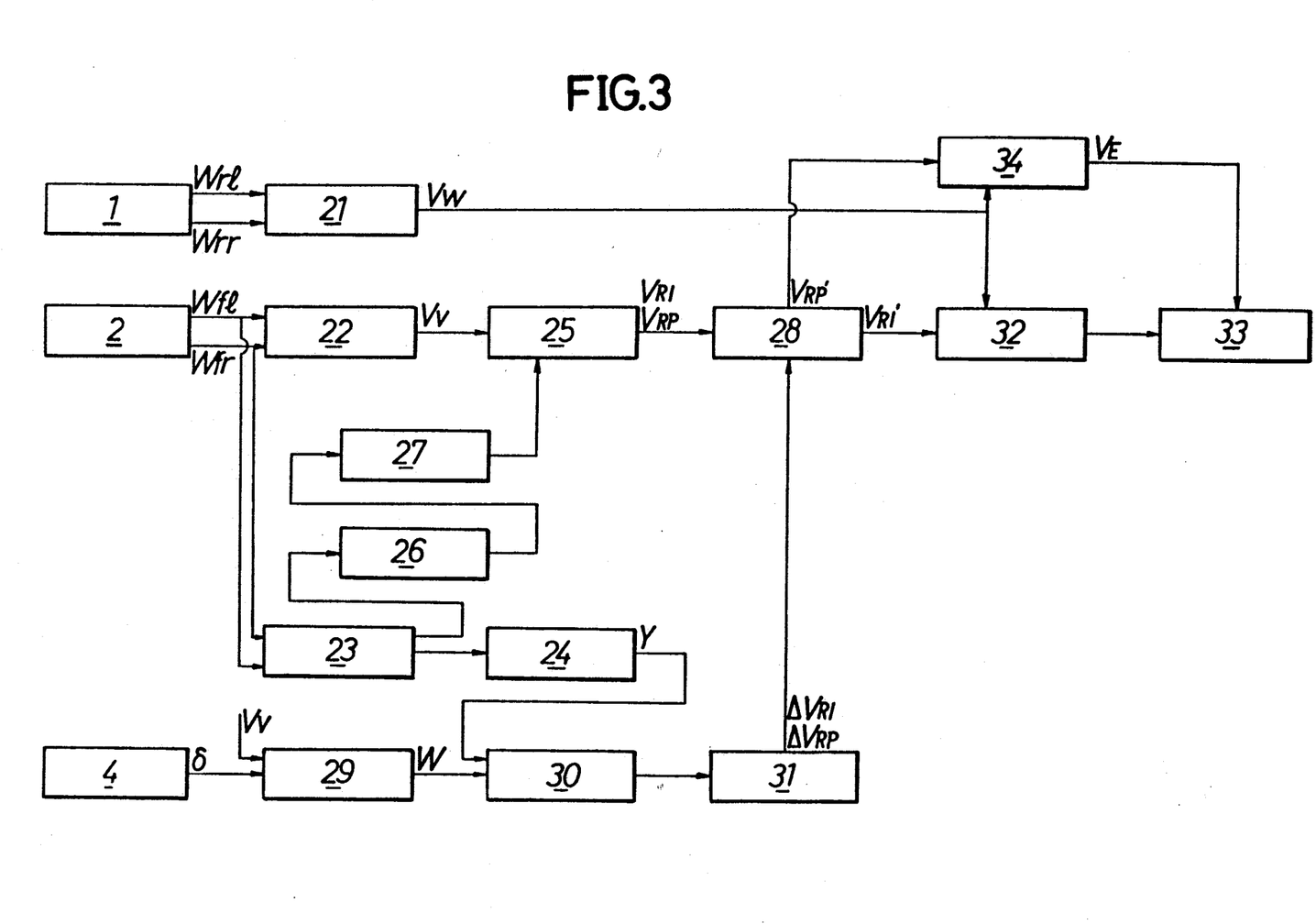
FIG. 3 is a block diagram illustrating a circuit arrangement of the driving-wheel slip control system.

The processes of the driving-wheel slip control executed in the electronic control unit U will be described below in connection with a block diagram in FIG. 3.

Speeds Wrl and Wrr of the left and right driving wheels of the vehicle are detected by the driving-wheel speed detectors 1, and speeds Wfl and Wfr of the left and right driven wheels are detected by the driven-wheel speed detectors 2. The left and right driving-wheel speeds Wrl and Wrr detected in the driving-wheel speed detectors 1 are supplied to a driving-wheel speed calculating means 21 where a driving-wheel speed Vw is calculated as an average value of the left and right driving-wheel speeds Wrl and Wrr. On the other hand, the left and right driven-wheel speeds Wfl and Wfr detected in the driven-wheel speed detectors 2 are supplied to a driven-wheel speed calculating means 22 where a driven-wheel speed Vv, i.e., a vehicle speed is calculated as an average value of the left and right driven-wheel speeds Wfl and Wfr.

The left and right driven-wheel speeds Wfl and Wfr detected in the driven-wheel speed detectors 2 are supplied to a driven-wheel speed difference calculating means 23 where a difference between the left and right driven-wheel speeds Wfl and Wfr is calculated. In an actual yaw rate calculating means 24, the difference between the left and right driven-wheel speeds Wfl and Wfr is input into a low-pass filter to remove an influence due to a resonance component in a vibration of a suspension and is filtered to take out a lower frequency region (e.g., at most 5 hertz) useful for a control of the motion of the vehicle, thus obtaining an actual yaw rate Y.

The driven-wheel speed Vv calculated in the driven-wheel speed calculating means 22 is applied to a reference value determination means 25 which determines a reference value for a slip state of the driving wheel. In the reference value determination means 25, a first reference speed $V_{R1}$ and a target reference speed $V_{RP}$ of the driving-wheel speed are calculated from the driven-wheel speed Vv input thereinto in accordance with the following expressions:

$$V_{R1} = K_1 \cdot V_v$$

$$V_{RP} = K_p \cdot V_v$$

wherein each of $K_1$ and $K_p$ is a constant with the proviso that $K_1 < K_p$. The first reference speed $V_{R1}$ represents a reference speed at which the control of slipping of the driving wheel is started to reduce the output torque from the internal combustion engine if the driving-wheel speed exceeds the first reference speed $V_{R1}$. The target reference speed $V_{RP}$ represents a driving-wheel speed at which an acceptable slip rate for the driving wheel is provided. During the calculations, a bad-road detecting means 26 detects a condition of a road surface on the basis of the magnitude of a signal of suspension resonant frequency component in the driven-wheel speed difference Wfl-Wfr produced from the driven-wheel speed difference detector 23. If a bad-road judging means 27 has decided that the vehicle is travelling on a bad road where an apparent slip signal is liable to be produced, the reference value determination means 25 controls the proportional constants $K_1$ and $K_p$ to be set larger as compared with on a normal road, and thus, the output from the internal combustion engine E is reduced at an early stage.

The first reference speed $V_{R1}$ and the target reference speed $V_{RP}$ determined in the reference value determination means 25 are applied to a reference value correcting means 28 where they are corrected in accordance with the steered state of the vehicle. More specifically, the steering angle δ from the steering angle detector 4 is applied, together with the driven-wheel speed Vv delivered from the driven-wheel speed calculating means 22, to a reference yaw rate calculating means 29 where a reference yaw rate W is calculated. This reference yaw rate W and the actual yaw rate Y calculated in the actual yaw rate calculating means 24 are applied to an US/OS judging means 30 which judges on the basis of a difference between the yaw rates W and Y, whether the vehicle is in an understeered state or in an oversteered state and calculates a degree of deviation of the actual yaw rate Y from the reference yaw rate W. Correcting quantities $\Delta V_{R1}$ and $\Delta V_{RP}$ for correcting the first reference speed $V_{R1}$ and the target reference speed $V_{RP}$ are calculated in a reference value-correcting quantity determination means 31 in accordance with the steered state of the vehicle. The values of the correcting quantities $\Delta V_{R1}$ and $\Delta V_{RP}$ are determined so that the target reference speed is raised to gain the driving wheel torque when an under-steering tendency is produced during steering, for example, in a rear wheel drive vehicle, and the target reference speed is lowered to reduce the driving wheel torque when an over-steering tendency is produced, thereby preventing the vehicle from turning in an undesirable direction.

A corrected first reference speed $V_{R1}'$ and a corrected target reference speed $V_{RP}'$ are determined in the reference value correcting means 28 according to the following expressions.

$$V_{R1}' = V_{R1} + \Delta V_{R1}$$

$$V_{RP}' = V_{RP} + \Delta V_{RP}.$$

The corrected first reference speed $V_{R1}'$ and the driving-wheel speed Vw calculated in the driving-wheel speed calculating means 21 are supplied to a control start/completion judging means 32. If the driving-wheel speed Vw exceeds the corrected first reference speed $V_{R1}'$, a driving-wheel torque reducing means 33 is commanded to start the control of slipping of the driving wheel. On the other hand, a deviation $V_E = V_{RP}' - Vw$ between the corrected target reference speed $V_{RP}'$ and the actual driving-wheel speed Vw is calculated in a deviation calculating means 34 and supplied to the driving-wheel torque reducing means 33. The output torque from the internal combustion engine E is reduced by the driving-wheel torque reducing means 33 through the throttle valve control means 7, the fuel cut control means 9 and the ignition retard control means 12 to converge the driving wheel speed Vw to the corrected target reference speed $V_{RP}'$.

As means for reducing the output torque from the internal combustion engine E as described above to inhibit the slipping of the driving wheel, the throttle valve control means 7, the fuel cut control means 9 and the ignition retard control means 12 are used. These three means are operated in the following manner on the basis of the deviation $V_E$ between the corrected target reference speed $V_{RP}'$ and the actual driving-wheel speed Vw and the value of a variation rate $\dot{V}_E$ of the deviation $V_E$ with lapse of time.

Figure 4A:
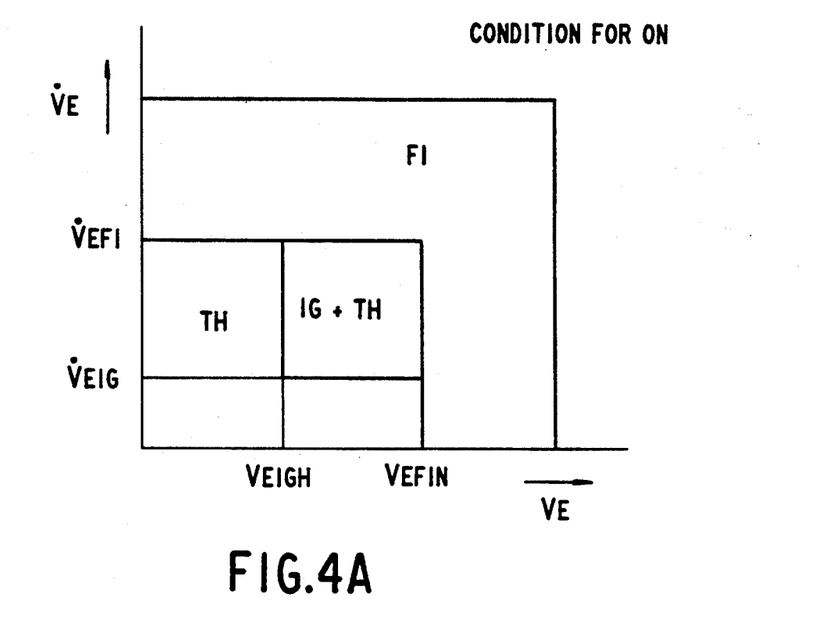
FIGS. 4A and 4B are diagrams for explaining an action of a driving-wheel torque reducing means.
Figure 4B:
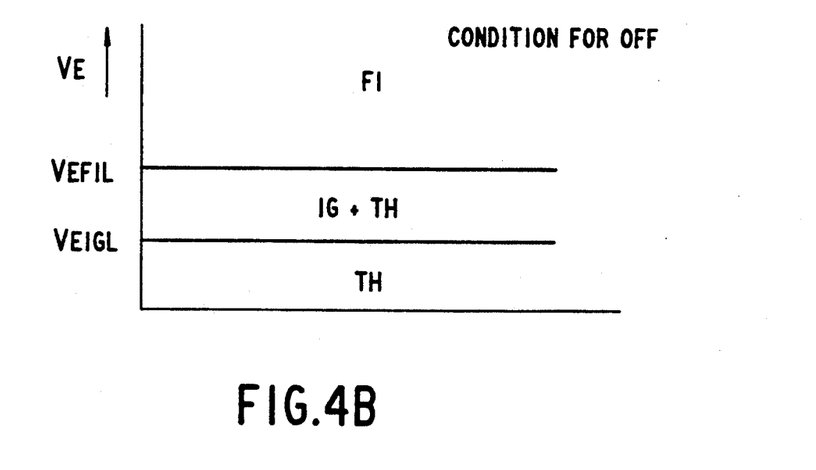

As apparent from FIGS. 4A and 4B, the fuel cut control means 9 (FI) is arranged to start the control when the deviation $V_E$ exceeds a threshold value $V_{EFIH}$, or when the variation rate $\dot{V}_E$ exceeds a threshold value $\dot{V}_{EFI}$, and to complete the control when the deviation $V_E$ is lower than a threshold value $V_{EFIL}$. During controlling by the fuel cut control means 9, the throttle valve control means 7 (TH) effects an open loop control at an initial opening degree which will be described hereinafter, and the control by the ignition retard control means 12 (IG) is not effected.

The ignition retard control means 12 (IG) is arranged to start the control when the deviation $V_E$ is between the threshold value $V_{EFIH}$ and a threshold value $V_{EIGH}$ and the variation rate $\dot{V}_E$ is between a threshold value $\dot{V}_{EIG}$ and the threshold value $\dot{V}_{EFI}$, and to complete the control when the deviation $V_E$ is lower than a threshold value $V_{EIGL}$. During controlling by the ignition retard control means 12, the throttle valve control means 7 effects a throttle opening degree feed-back control which will be described hereinafter.

The throttle valve control means 7 starts the control independent of the controlling and non-controlling by the ignition retard control means 12 to effect the throttle opening degree feed-back control, when the deviation $V_E$ is lower than the threshold value $V_{EFIH}$ and the variation rate $\dot{V}_E$ is lower than the threshold value $\dot{V}_{EFI}$, i.e., when the fuel cut control means 9 is in its non-controlling state.

With a relatively large slipping of the driving wheel, the fuel cut control means 9 providing a large decrement of the output torque is used, and with a relatively small slipping of the driving wheel, the throttle valve control means 7 is used in principle. The feed-back control of the throttle valve is characterized by its slow responsiveness due to the nature of an actuator. However, if there is an external disturbance requiring a quick response during the feed-back control of the throttle valve, an ignition retard control is also used together with the feed-back control. This ignition retard control is a P-term feed-back control of a quick responsiveness and hence, a quick response can be provided. Moreover, a problem of interference between two actuators for the respective throttle valve control and ignition retard control is avoided by providing a feed-forward control of the throttle valve when the ignition retard control is completed.

Figure 5:
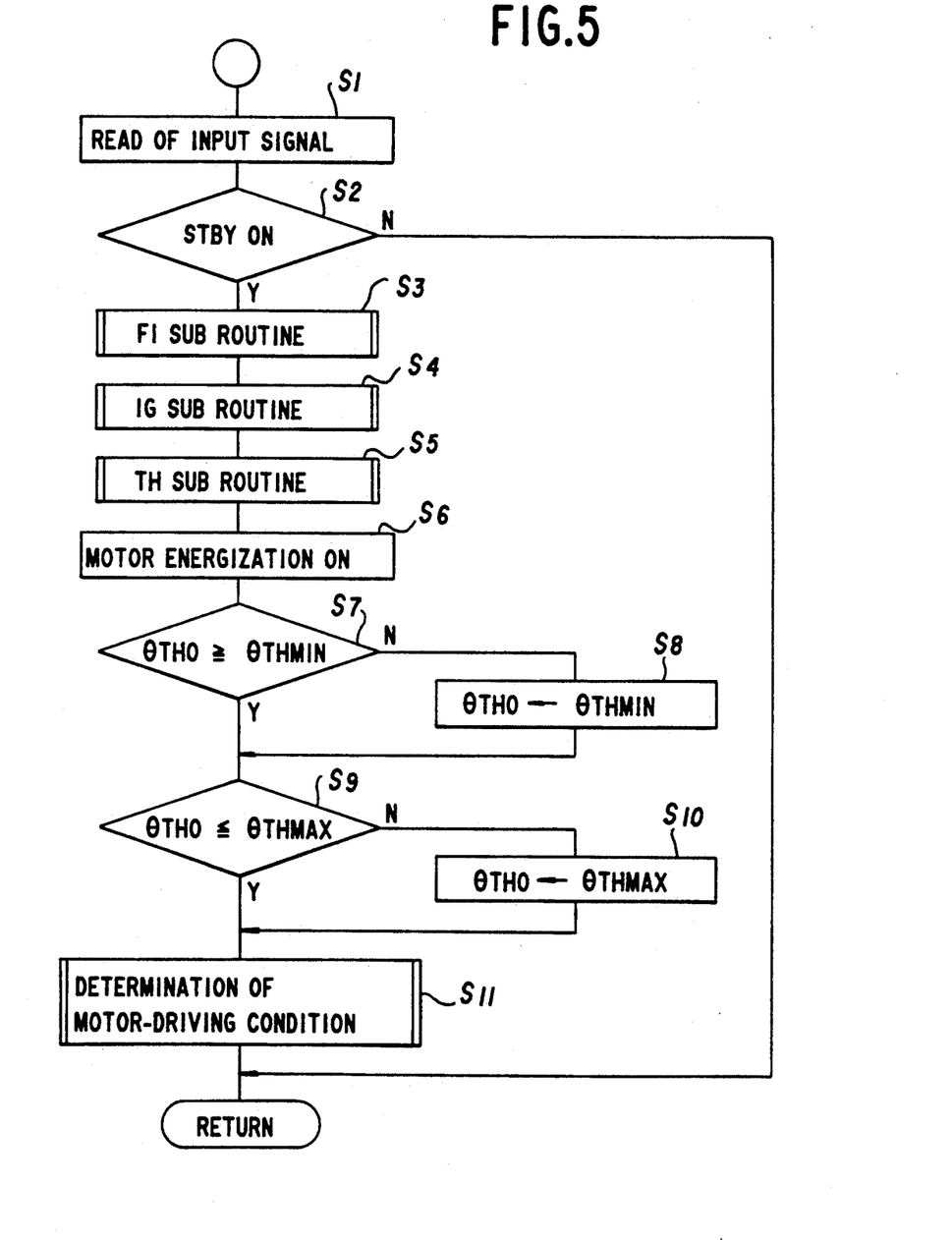
FIG. 5 is a flow chart of a main routine thereof.
Figure 6A:
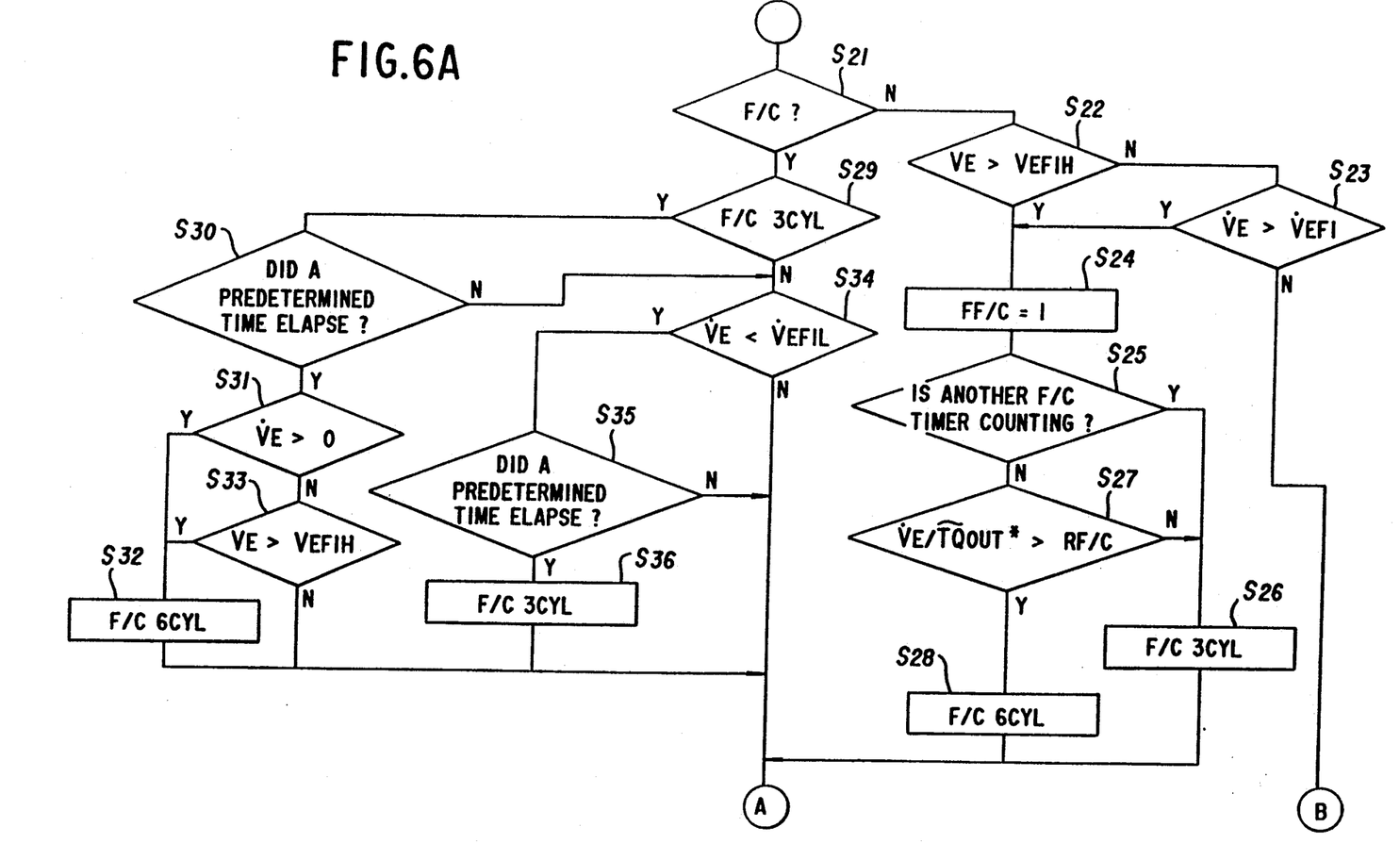
FIGS. 6A and 6B are flow charts of a sub-routine of a fuel cut control.
Figure 6B:
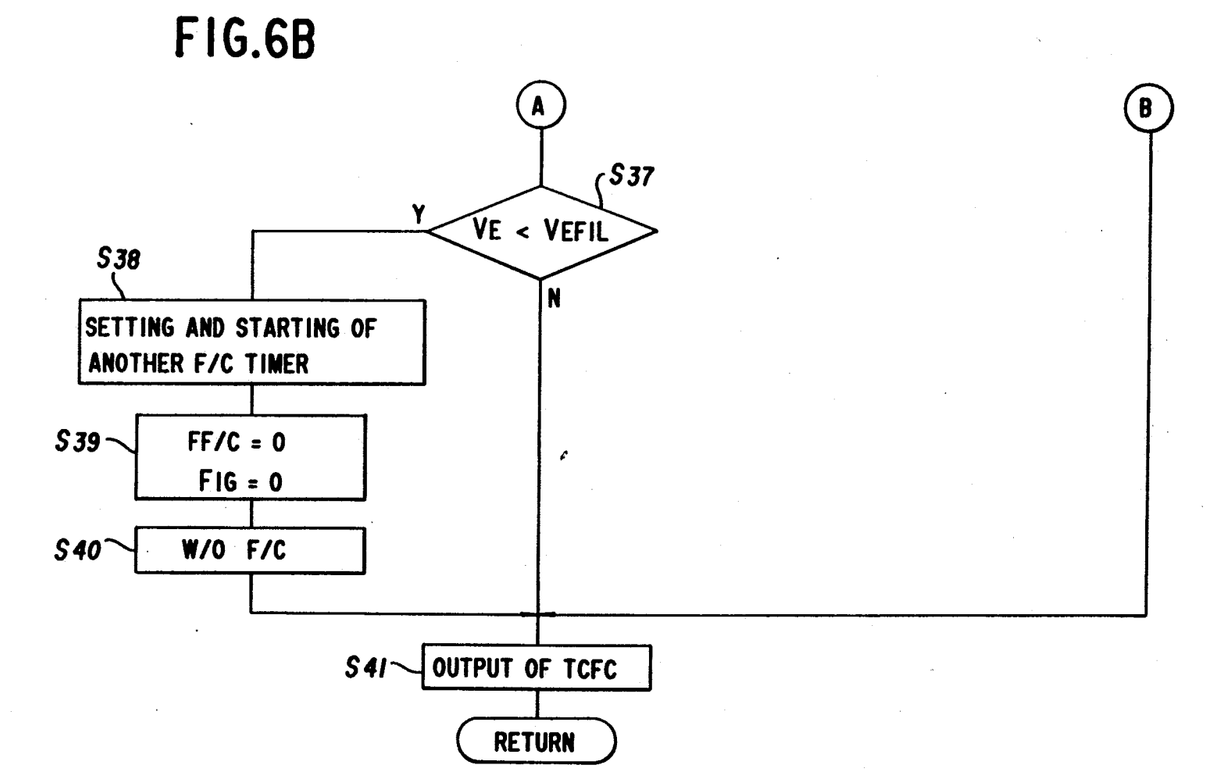
Figure 7:
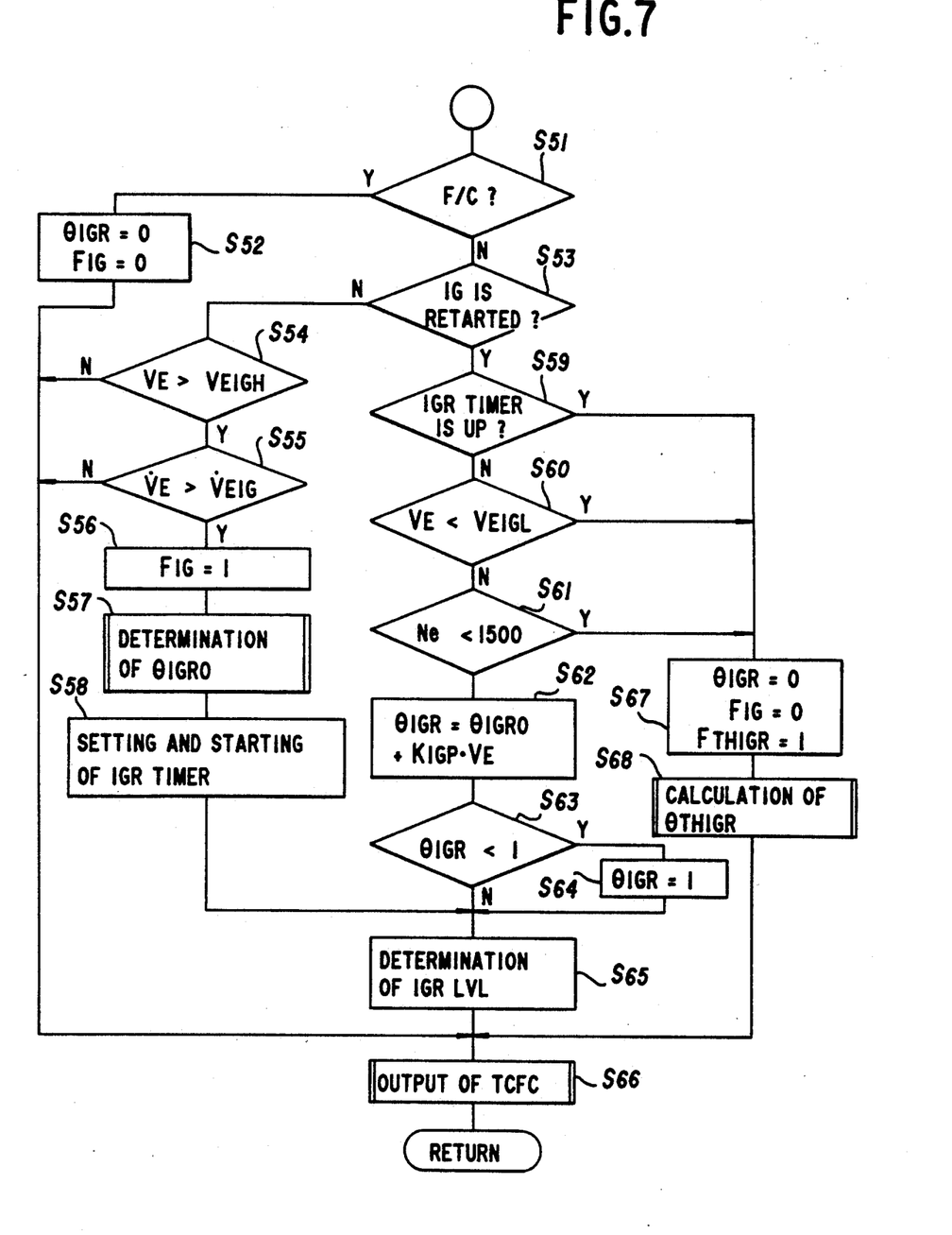
FIG. 7 is a flow chart of a sub-routine of an ignition retard control.

The processes of a control program executed in the driving-wheel torque reducing means 33 will be described below in connection with flow charts in FIGS. 5 to 8. FIG. 5 corresponds to a main routine; FIGS. 6A and 6B correspond to a sub-routine (step S3) in FIG. 5 of the fuel cut control; FIG. 7 corresponds to a sub-routine (step S4) in FIG. 5 of the ignition retard control; and FIGS. 8A and 8B correspond to a sub-routine (step S5) in FIG. 5 of the throttle valve control.

Referring to FIG. 5, signals from the detectors such as the driving-wheel speed detector 1, the driven-wheel speed detector 2 and the steering-angle detector 4 are read at a step S1. If a traction control is started at a step S2 on the basis of the decision that the driving wheel speed Vw has exceeded the corrected first reference speed $V_{R1}'$, the sub-routine of the fuel cut control, the sub-routine of the ignition retard control and the sub-routine of the throttle valve control are carried out at steps S3, S4 and S5, respectively. Then, at a step S6, power supply to a pulse motor is turned ON to control the opening and closing of the throttle valve 8, and at steps S7 to S10, the target throttle opening degree is limited to a range between a lower limit value $\theta_{THMIN}$ and an upper limit value $\theta_{THMAX}$. Thereafter, a driving condition for the pulse motor is set at a step S11.

The processes of the fuel cut control will be described below in connection with the flow chart in FIGS. 6A and 6B illustrating the sub-routine of the step S3. It should be noted that this flow chart is carried out prior to an intake stroke of each cylinder by a predetermined angle to permit an injection of the fuel with a good accuracy at each intake stroke.

First, when it is decided at a step S21 that the processing is already not in fuel-cutting, a fuel-cutting flag $F_{F/C}$ is set to start the fuel cutting at step S24, if the deviation $V_E$ exceeds the threshold value $V_{EFIH}$ at a step S22, or the driving-wheel slip variation rate $\dot{V}_E$ exceeds the threshold value $\dot{V}_{EFI}$ at a step S23 even if the deviation $V_E$ is equal to or less than the threshold value $V_{EFIH}$. Then, at a step S25, it is decided whether or not another fuel-cutting timer is counting 500 ms. If YES, i.e., if 500 ms is not lapsed from an instant when the fuel-cut control state has been once changed to the non-control state, the number of fuel-cut cylinders is determined to three which is half of the number of all cylinders in case of a six-cylinder engine at a step S26, thereby avoiding an extreme reduction in torque of the driving wheel at the time of entering another fuel-cutting. If the another fuel-cutting timer is not counting, i.e., if 500 ms has been lapsed from the completion of the last fuel-cutting state, it is regarded as entering new fuel-cutting and a ratio $\dot{V}_E/\tilde{TQ}_{OUT}*$ of the variation rate $\dot{V}_E$ to a driving-wheel output torque $\tilde{TQ}_{OUT}*$ calculated on the basis of an engine output torque and a reduction ratio is compared with a reference value $R_{F/C}$ at a step S27. If the slipping is small, the number of the fuel-cut cylinders is determined to three at the step S26. If the slipping is large, the number of the fuel-cut cylinders is determined to six at a step S28.

On the other hand, if it is decided at the step S21 that the fuel-cutting is going on, it is decided at steps S29 to S36 whether three or six of the six cylinders in the internal combustion engine E are subjected to the fuel-cutting. More specifically, if the number of fuel-cut cylinders is three at the step S29, and if it is decided at the step S30 that a predetermined time has been elapsed, it is judged at the step S31 whether the variation rate $\dot{V}_E$ is positive or negative. If $V_E$ is positive, i.e., if the deviation $V_E$ is increasing, the number of the fuel-cut cylinders is increased to six at the step S32 to reduce the output torque from the internal combustion engine E. If the deviation $V_E$ exceeds the threshold value $V_{EFIH}$ at the step S33 even when the variation rate $\dot{V}_E$ is negative or zero, the number of fuel-cut cylinders is likewise increased to six at the step S32. On the other hand, when the number of the fuel-cut cylinders is six at the step S29, the number of the fuel-cut cylinders is reduced from six to three at the step S36, if the variation rate $\dot{V}_E$ is smaller than the threshold value $\dot{V}_{EFIL}$ ($\dot{V}_{EFIL} < \dot{V}_{EFI}$) at the step S34 and it is decided at the step S35 that the predetermined time has been elapsed. Thus, an optimal number of the fuel-cut cylinders is selected in accordance with the current slipping condition.

When the number of the fuel-cut cylinders is determined in this manner, the fuel-cutting is carried out at a step S41 if the deviation $V_E$ is larger than or equal to the threshold value $V_{EFIL}$ at a step S37. On the other hand, if the deviation $V_E$ is less than the threshold value $V_{EFIL}$ at the step S37, another fuel-cutting timer is set at 500 ms and started at a step S38, and the fuel-cutting flag $F_{F/C}$ and an ignition retard flag $F_{IG}$ are reset to 0 (zero) at a step S39, and the fuel-cutting is stopped at a step S40.

The processes of the ignition retard control will be described below in detail in connection with the flow chart in FIG. 7 illustrating the sub-routine of the step S4. Processes in the flow chart are executed for each cylinder, so that the ignition retard control is conducted immediately with the results of the processes.

First, when the fuel-cutting is being conducted for the cylinders to be currently controlled at a step 51, the ignition retard control is not conducted, and the ignition retard angle $\theta_{IGR}$ and the ignition retard flag $F_{IG}$ are reset to 0 (zero) at a step S52. If the fuel-cutting is not going on at the step S51 and the processing is not in ignition retard at a step S53, and if two conditions, deviation $V_E$>threshold value $V_{EIGH}$ and variation rate $\dot{V}_E$>threshold value $\dot{V}_{EIG}$ are both satisfied, the ignition retard flag $F_{IG}$ is set to 1 (one) at a step S56. Then, the ignition retard angle $\theta_{IGR}$ as a reference is determined at a step S57 on the basis of a current value of the total driving-wheel torque $\tilde{TQ}_{OUT}*$, and the ignition retard timer is set and started at a next step S58.

On the other hand, if the processing is in ignition retard control at the step S53 and the ignition retard timer is counting at a step S59 and moreover, if the condition of, deviation $V_E$>threshold value $V_{EIGL}$ is established at a step S60 and the rotational number Ne of the internal combustion engine E>1,500 is established at a step S61, an ignition retard angle $\theta_{IGR}$ is calculated at a step S62 according to the following expression:

$$\theta_{IGR} = \theta_{IGR0} + K_{IGR} \cdot V_E$$

wherein $K_{IGR}$ is a constant depending upon the value of the total driving-wheel torque $\tilde{TQ}_{OUT}*$. Then, the lower limit value of the ignition retard angle $\theta_{IGR}$ is limited to 1° at next steps S63 and S64 and thereafter, an ignition retard level is determined on the basis of the value of $\theta_{IGR}$ at a step S65, and the ignition retarding is carried out at a step S66.

Even if the processing is in ignition retard at the step S53, when the counting of the ignition retard timer has been ended up at the step S59, or when the deviation $V_E$ is less than the threshold value $V_{EIGL}$ at the step S60, or when the rotational number Ne of the internal combustion engine E is less than 1,500 at the step S61, the ignition retard angle $\theta_{IGR}$ and the ignition retard flag $F_{IG}$ are reset to 0 (zero) and an ignition retard converting flag $F_{THIGR}$ is set at a step S67 to stop the ignition retard control. At a next step S68, a conversion value $\theta_{THIG}$ which will be described hereinafter and which results from conversion of an ignition retard quantity into a throttle opening degree is calculated to provide the feed-forward control of the throttle valve 8. The stopping of the ignition retard control by using the ignition retard timer is conducted in order to prevent an increasing of the temperature of exhaust gas, because if the ignition time retard is carried out for a long time, the temperature of the exhaust gas increases to promote the deterioration of a catalyst for the exhaust gas.

Figure 8A:
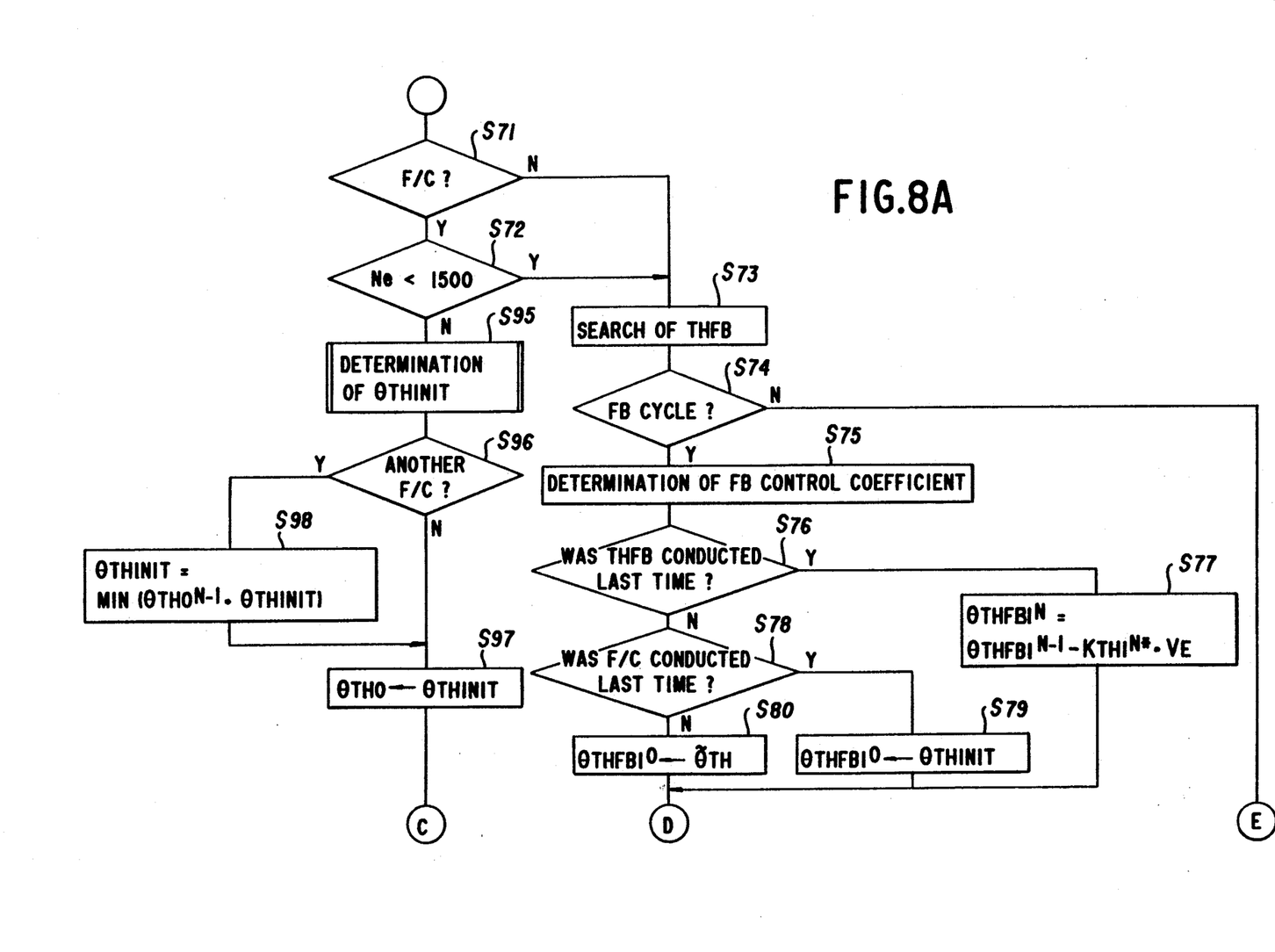
FIGS. 8A and 8B are flow charts of sub-routines of a throttle valve control.
Figure 8B:
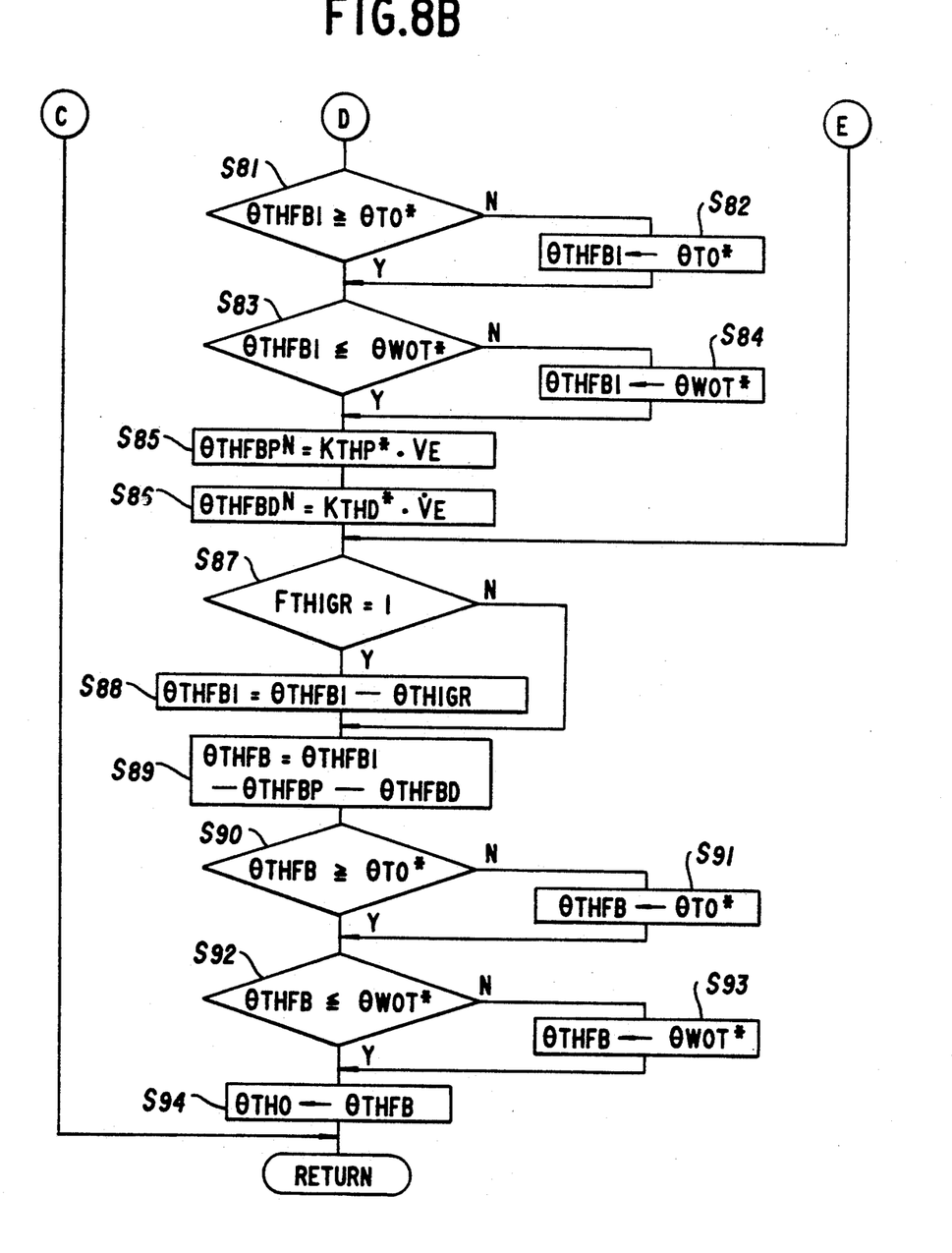

The processes of the throttle valve control will be described below in connection with the flow charts in FIGS. 8A and 8B illustrating the sub-routine of the step S5. This flow chart is carried out at regular interval.

If the fuel-cutting is not going on at a step S71, or if Ne<1,500 at a step S72 even if the fuel-cutting is going on at the step S71, the feed-back control of the throttle valve 8 is conducted at a step S73 and succeeding steps. More specifically, a throttle feed-back cycle which is a function of the rotational number Ne is searched from a map at the step S73. If the processing is in the throttle feed-back cycle at a step S74, control gains $K_{THP}*$, $K_{THI}*$ and $K_{THD}*$ are determined at a step S75 to provide a PID feed-back control of the throttle opening degree. At a next step S76, it is judged whether or not the throttle feed-back was conducted last time. If YES, i.e., if the throttle feed back is going on, an I term, $\theta_{THFBI}{}^N$ is calculated at a step S77 according to the following expression:

$$\theta_{THFBI}{}^N = \theta_{THFBI}{}^{N-1} - K_{THI}{}^{N*} \cdot V_E.$$

It is to be noted that the negative sign is attached to the second term on the right side in the above expression because $V_E$ assumes a value larger than zero on a positive side. On the other hand, if NO at the step S76, namely, if the processing newly enters the throttle feed-back, an initial throttle opening degree is set in the following manner. At a step S78, it is decided whether or not the fuel-cutting has been conducted last time. If YES, i.e., if the processing is returned from the fuel-cutting, the initial throttle opening degree $\theta_{THINIT}$ at the time of returning from the fuel-cutting (which will be described hereinafter) is replaced for $\theta_{THFBI}^0$ at a step S79. If the fuel-cutting is not conducted last time, namely, if $V_E$ does not exceed the threshold value $V_{EFIH}$, a filter value (average value) $\bar{\theta}_{TH}$ of the throttle opening degrees up to that time is replaced for $\theta_{THFBI}^0$ at a step S80. Then, at subsequent steps S81 to S84, a limiting process is conducted so that an I term, $\theta_{THFBI}$ is equal to or more than a so-called no-load throttle opening degree $\theta_{TO}^*$ corresponding to an engine rotational number compensating for a friction loss of the internal combustion engine E and equal to or less than a throttle opening degree $\theta_{WOT}^*$ which permits generation of, for example, 95% of the maximum torque which can be output at the engine rotational number of that time. The throttle opening degree $\theta_{TO}^*$ and the throttle opening degree $\theta_{WOT}^*$ are searched from a table which provides a relationship between the engine rotational number and the throttle opening degree.

Then, a P term, $\theta_{THFBP}^N$ is calculated at a step S85 according to the following expression:

$$\theta_{THFBP}^N = K_{THP}^* \cdot V_E$$

and further, a D term, $\theta_{THFBD}^N$ is calculated at a step S86 according to the following expression:

$$\theta_{THFBD}^N = K_{THD}^* \cdot \dot{V}_E$$

If the ignition retard converting flag $F_{THIGR}$ is set at a next step S87, the I term, $\theta_{THFBI}$ is corrected at a step S88 by a conversion value $\theta_{THIGR}$ resulting from conversion of an ignition retard quantity into a throttle opening degree. If a feed-back control quantity $\theta_{THFB}$ is then calculated at a step S89 according to the following expression:

$$\theta_{THFB} = \theta_{THFBI} - \theta_{THFBP} - \theta_{THFBD}$$

wherein the negative sign is attached to the second and third terms on the right side in the above expression because $V_E$ likewise assumes values larger than zero on a positive side, the same limiting process as at the steps S81 to S84 is carried out at subsequent steps S90 to S93, so that a lower limit and an upper limit of the feed-back control quantity $\theta_{THFB}$ are defined.

The feed-back control quantity $\theta_{THFB}$ is determined as a target throttle opening degree $\theta_{THO}$ at a step S94, so that the pulse motor 7 is driven to open and close the throttle valve 8.

If the fuel-cutting is going on at the steps S71 and S72 and a condition Ne>1,500 is established, an initial throttle opening degree $\theta_{THINIT}$ is found at a step S95 for the surplus component of torque applied to the driving-wheel which is described in detail in Japanese Patent Application No. 10122/90 filed by the present applicant. This initial throttle opening degree $\theta_{THINIT}$ is used at the step S79 as an initial throttle opening degree at an instant when the throttle feed-back control is newly started upon returning from the fuel cut. If the initial throttle opening degree $\theta_{THINIT}$ is determined in this manner, it is judged at a step S96 whether the fuel-cutting which is currently going on is a first fuel-cutting or another one. If it is a first fuel-cutting, the initial throttle opening degree $\theta_{THINIT}$ found at the step S95 is determined at a step S97 as a target throttle opening degree $\theta_{THO}$ at an instant of returning from the fuel-cutting. On the other hand, if the fuel-cutting is decided at the step S96 to be another fuel-cutting, a smaller one of a target throttle opening degree $\theta_{THO}^{N-1}$ when entering the mentioned another fuel-cut and an initial throttle opening degree $\theta_{THINIT}$ when returning from that another fuel-cutting is selected as the initial throttle opening degree $\theta_{THINIT}$ when returning from the another fuel-cutting. This selected initial throttle opening degree $\theta_{THINIT}$ is used when step S97 as a target throttle opening degree $\theta_{THO}$ at the returning from the another fuel-cutting. This ensures that the target throttle opening degree when returning from the another fuel-cutting is made necessarily smaller than the target throttle opening degree when entering the another fuel-cutting, resulting in an avoidance of a disadvantage that the fuel-cutting is repeatedly conducted.

Although the traction control conducted only by the engine control has been described in the above embodiment of the present invention, it will be understood that the present invention is not limited thereto and is applicable to an engine control combined with a brake device control, a control for a device for speed-change between an engine and driving wheels, and a control for a device for distributing a driving force to front and rear wheels. In addition, the excessive slipping of the driving wheel has been detected by the deviation $V_E$ and the variation rate $\dot{V}_E$ in the above embodiment, but the present invention is not limited thereto, and it is also possible to use one or a combination of a slip rate of the driving wheel, a quantity or rate of variation in the slip rate, an acceleration of the driving wheel, and a differentiated value of the acceleration of the driving wheel.

What is claimed is:

1. A driving-wheel slip control system comprising:
    a throttle valve control means;
    a fuel cut control means and an ignition retard control means for controlling an output of an internal combustion engine,
    wherein when an excessive slipping of a driving wheel driven by said internal combustion engine is detected, the output from said internal combustion engine is reduced by use of at least one of said throttle valve control means, said fuel cut control means and said ignition retard control means,
    wherein, within a region for control of the excessive slipping of the driving wheel, a third pair of starting limits of operation of said ignition retard control means is provided between a first pair of starting limits of operation of said throttle valve control means and a second pair of starting limits of operation of said fuel cut control means and
    wherein said first, second and third pairs of starting limits are defined by threshold values of vehicle speed deviation and a derivative of said vehicle speed deviation.

2. A driving-wheel slip control system according to claim 1, wherein said throttle valve control means is simultaneously operated when said ignition retard control means is operated.

3. A driving-wheel slip control system according to claim 2, further including a control quantity calculating means for calculating control quantities of said ignition retard control means and said throttle valve control means on the basis of a deviation between a target value and an actual value of an excessive slipping of the driving wheel, when excessive slipping has been detected.

4. A driving-wheel slip control system according to claim 3, wherein said control quantity calculating means includes a correcting value calculating means for finding a throttle valve opening degree correcting value for correcting a throttle valve opening degree control quantity for said throttle valve control means on the basis of a retard control quantity for said ignition retard control means.

5. A driving-wheel slip control system according to claim 1, 2, 3 or 4, wherein the operation of said ignition retard control means is controlled by a timing means.

6. A driving-wheel slip control system according to claim 1, 2, 3 or 4, further including a calculating means for calculating an initial throttle opening degree setting of said throttle valve control means, and an initial opening degree determination means for determining said throttle opening degree at an initial throttle opening degree setting found by said calculating means, said calculating means and said initial opening degree determination means being operated when said fuel cut control means is operated.

7. A driving-wheel slip control system according to claim 1, 2 or 3, wherein when the excessive slipping of the driving wheel enters between said first pair of starting limits of operation of said throttle valve control means, a feed-back control is started in accordance with said excessive slipping of the driving wheel by using an initial throttle opening degree determined by an initial opening degree determination means as an initial value.

8. A driving-wheel slip control system according to claim 1, 2 or 3, wherein said fuel cut control means cuts at least half of a plurality of cylinders in said internal combustion engine.

9. A driving-wheel slip control system according to claim 1, 2 or 3, wherein a control of the ignition retard control means is started when a control region thereof is in a predetermined range of said excessive slipping and in a predetermined range of quantity in variation of said excessive slipping.

10. A driving-wheel slip control system according to claim 9, wherein said ignition retard control means terminates a control thereof when the excessive slipping becomes equal to or less than a predetermined value which is set lower than the predetermined range of said excessive slipping.

11. A driving wheel slip control system according to claims 1, 2 or 3, wherein said fuel cut control means starts controlling when said excessive slipping becomes equal to or greater than a first pre-determined value, or when a derivative of said vehicle speed deviation of said excessive slipping becomes equal to or greater than a second pre-determined value.

12. A driving-wheel slip control system according to claim 11, wherein said fuel cut control means terminates a control thereof when the excessive slipping becomes equal to or less than a third predetermined value which is set lower than said first predetermined value.

* * * * *